United States Patent [19]

Castrantas

[11] 4,367,212
[45] Jan. 4, 1983

[54] CONTROL OF THIOSULFATE IN WET DESULFURIZATION PROCESS SOLUTIONS

[75] Inventor: Harry M. Castrantas, Newtown, Pa.

[73] Assignee: FMC Corporation, Philadelphia, Pa.

[21] Appl. No.: 210,697

[22] Filed: Nov. 28, 1980

Related U.S. Application Data

[63] Continuation of Ser. No. 35,656, May 3, 1979, abandoned.

[51] Int. Cl.$^3$ .............................................. C01B 17/04
[52] U.S. Cl. ................................ 423/573 R; 423/226
[58] Field of Search ................ 423/226, 567, 571, 573

[56] References Cited

U.S. PATENT DOCUMENTS 3,972,989  8/1976  Fenton et al. ....................... 423/573
4,083,945  4/1978  Fenton et al. ....................... 423/573

FOREIGN PATENT DOCUMENTS 7310225  1/1974  Netherlands ........................ 423/573

OTHER PUBLICATIONS

Kirk-Othmer; *Encyc. of Chem. Tech.*, vol. 20.

*Primary Examiner*—G. O. Peters
*Attorney, Agent, or Firm*—Christopher Egolf

[57] ABSTRACT

A method for controlling the concentration of dissolved thiosulfate byproduct which forms in a wet desulfurization process, by introducing a peroxygen chemical into its recirculating aqueous absorption medium. A peroxygen chemical such as aqueous hydrogen peroxide is introduced into the recirculating aqueous alkaline absorption medium, preferably after its regeneration, in an amount sufficient to maintain the concentration of thiosulfate byproduct below a saturation concentration. The method is applicable to cyclic wet desulfurization processes, used to recover elemental sulfur from $H_2S$-containing gas streams, in which the absorption medium contains a regenerable oxidizing agent and is subject to thiosulfate byproduct buildup.

20 Claims, 1 Drawing Figure

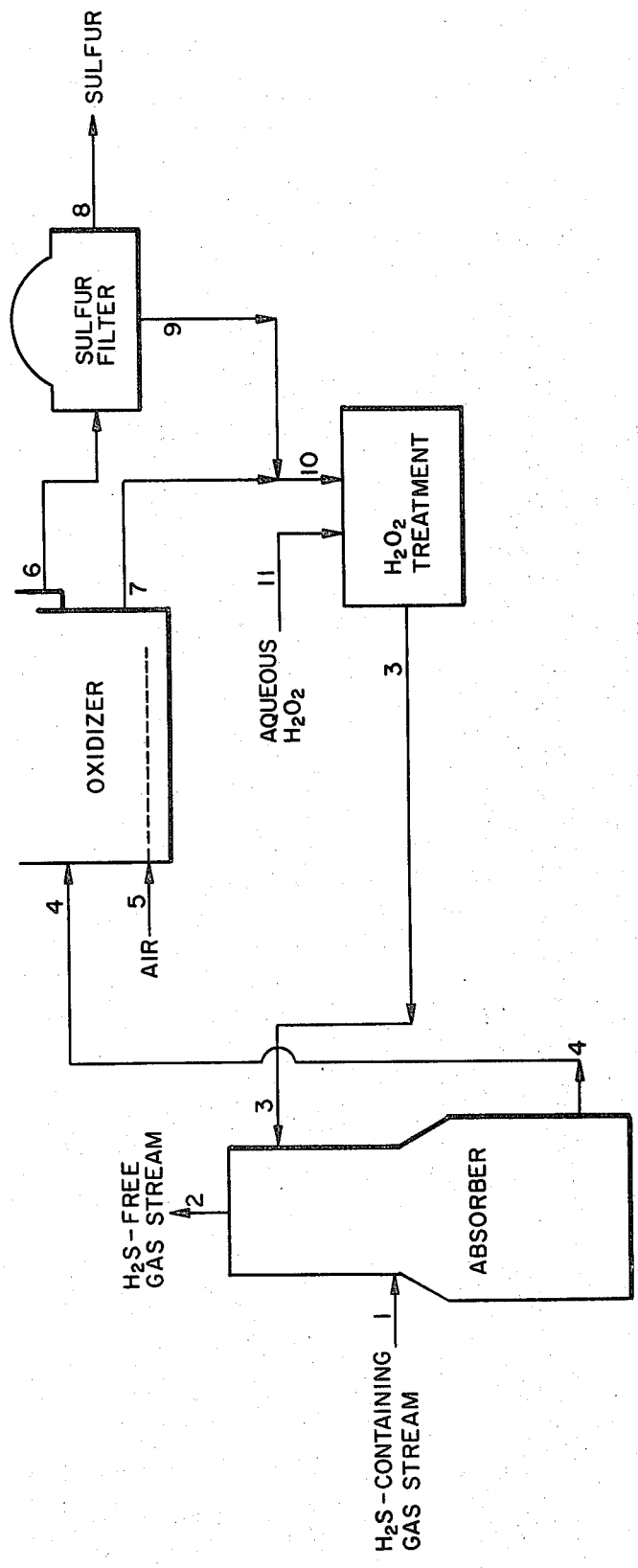

CONTROL OF THIOSULFATE IN WET DESULFURIZATION PROCESS SOLUTIONS

This application is a continuation of application Ser. No. 35,656, filed May 3, 1979, now abandoned.

This invention relates to the treatment of $H_2S$-containing gas streams to recover sulfur and, more particularly, to an improved wet desulfurization method employing a regenerable oxidizing agent and providing for control of thiosulfate byproduct formation in the recycled process solution.

Hydrogen sulfide ($H_2S$) is present as a contaminant in many gas streams such as natural gas, coal (coke-oven) gas, Claus process tail gas and the like. These gas streams are commonly treated by wet desulfurization processes which utilize an aqueous absorption medium to absorb hydrogen sulfide and yield a substantially $H_2S$-free gas stream. Such processes are usually operated in a cyclical manner and employ a regenerable oxidizing agent to oxidize the absorbed $H_2S$ to elemental sulfur, which is recovered. Regeneration of the reduced oxidizing agent in the aqueous absorption medium, after its oxidation of the $H_2S$ to sulfur, is typically accomplished by contacting the aqueous medium with air or oxygen gas.

One wet desulfurization process which has gained acceptance through the United States, especially in the treatment of Claus process tail gas streams, is the Stretford process. The Stretford process involves absorption of $H_2S$ into an aqueous alkaline solution which contains sodium vanadate and the sodium salt of anthraquinone disulfonic acid (ADA). The absorbed $H_2S$ forms sodium hydrosulfide (NaHS) in the solution, which is oxidized to elemental sulfur by the sodium vanadate present in the absorption liquor. After recovery of the solid sulfur, the absorption liquor, containing reduced vanadate and the ADA salt, is contacted with air to regenerate the oxidizing agent. The regenerated solution is then recycled for reuse.

A more detailed description of the Stretford process is provided by F. C. Riesenfeld and A. L. Kohl in *Gas Purification* (2nd ed., Gulf Publishing Company, Houston, 1974), at pp. 432–441.

A wet desulfurization process which employs quinone derivatives as the regenerable oxidizing agent is taught in U.S. Pat. No. 3,459,495. This wet desulfurization process is in commercial use, being known as the Takahax process, and employs sodium 1,4-naphthoquinone-2-sulfonate as the preferred quinone derivative. A similar process is disclosed in U.S. Pat. No. 3,937,795 which utilizes a naphthoquinone chelate compound as the regenerable oxidizing agent.

These and other similar wet desulfurization processes utilize a regenerable oxidizing agent that may be either an organic (e.g., anthraquinone or naphthoquinone) or inorganic (e.g., arsenate, ferric oxide) compound and which is employed in a multiple coupled redox reaction that occurs in the aqueous absorption medium. The regenerable oxidizing agent is principally noteworthy for its ease in oxidizing the absorbed sulfide species and of being reoxidized from a reduced state in the cyclical wet desulfurization process.

A common drawback associated with many wet desulfurization processes, particularly those involving quinone derivatives, is the formation of thiosulfate ($S_2O_3^=$) as a byproduct of the $H_2S$ oxidation reaction. Thiosulfate formation in cyclic wet desulfurization processes, if ignored, will eventually cause the thiosulfate level in the recycled aqueous absorption medium to reach a saturation concentration, and thiosulfate salts will then precipitate in the system.

The most common technique for controlling thiosulfate levels in wet desulfurization systems is to remove a portion of the recirculated aqueous absorption medium as a purge stream which is then discarded. Alternatively, the recirculated aqueous absorption medium may be allowed to accumulate thiosulfate to a level approaching saturation concentration, at which point all of the solution is dumped. Aqueous absorption medium that is discarded as a purge stream or dumped must be replaced with make-up solution, which must necessarily contain regenerable oxidizing agent and other valuable chemicals to replace that lost in the discarded medium.

Other methods have been proposed for controlling thiosulfate concentration in wet desulfurization system process liquors, but these involve costly and/or complex procedures, none of which are known to be in commerical use.

U.S. Pat. No. 3,642,448 teaches that thiosulfate formation in wet desulfurization systems can be minimized by removal of dissolved oxygen from the recirculated absorption solution prior to contacting the absorption medium with the $H_2S$-containing gas stream. This method, however, provides no means for coping with thiosulfate which does, in fact, form in the recirculated aqueous absorption solution.

U.S. Pat. No. 3,928,535 discloses a method for precipitating thiosulfate and/or sulfate salts from quinone-containing process solutions, by the addition of methanol as a salting-out agent.

U.S. Pat. No. 3,959,452 teaches a complex multi-step method for recovering vanadate and anthraquinone salts from a thiosulfate-containing Stretford process purge stream, by treating the purge stream with $H_3PO_4$ or $H_2SO_4$ and then with lime.

U.S. Pat. No. 3,972,989 acknowledges the necessity for a purge stream to maintain thiosulfate concentrations in Stretford-type process solutions below saturation concentration but indicates that the presence of small amounts of thiosulfate are beneficial for minimizing destruction of anthraquinone disulfonic acid salts which are also present in such solutions.

Japanese Patent Publication No. 1978/108068 discloses a method for treating a Takahax process purge stream, containing precipitated solids, to reduce its chemical oxygen demand (COD), through the addition of hydrogen peroxide and a catalyst. However, valuable components in the discarded purge stream of this method are not recovered for reuse.

The present invention provides a means for controlling the thiosulfate concentration in alkaline absorption media which contain regenerable oxidizing agents, without resort to purge streams or complex precipitation techniques for the removal of thiosulfate salts. Losses of valuable oxidizing agent and other chemicals in the recirculated alkaline absorption media are minimized, since this novel method obviates the need for a purge stream to remove thiosulfate.

In accordance with the present invention, the concentration of dissolved thiosulfate byproduct in the recirculated aqueous alkaline absorption medium of a cyclic wet desulfurization process is controlled by introducing a peroxide chemical into the thiosulfate-containing absorption medium in an amount sufficient to maintain the thiosulfate below its saturation concentration. Aqueous hydrogen peroxide, containing 30–50% by weight $H_2O_2$, is the preferred peroxide chemical.

The method of this invention is applicable to cyclic wet desulfurization processes for recovering sulfur from $H_2S$-containing gas streams, which processes are faced with the problem of thiosulfate byproduct forming in the aqueous absorption medium. Such processes ordinarily involve the conventional steps of (i) contacting an $H_2S$-containing gas stream with an aqueous alkaline absorption medium, containing a regenerable oxidizing agent;

(ii) absorbing $H_2S$ into the absorption medium and converting it to a hydrosulfide;

(iii) oxidizing the hydrosulfide with the regenerable oxidizing agent to form elemental sulfur, which is subsequently recovered from the absorption medium;

(iv) regenerating the absorption medium by contacting the reduced oxidizing agent with an oxygen-containing gas; and (v) recirculating the regenerated absorption medium to repeat the desulfurization cycle.

The method of this invention is preferably employed with conventional wet desulfurization processes which utilize anthraquinone-vanadate or naphthoquinone regenerable oxidizing agents.

In a preferred embodiment of the invention, aqueous hydrogen peroxide is introduced into the aqueous absorption medium after its regeneration and prior to its being contacted further with an $H_2S$-containing gas stream. The amount of hydrogen peroxide introduced into the thiosulfate-containing aqueous absorption medium is desirably less than the stoichiometric quantity required to oxidize all of the thiosulfate in the absorption medium to sulfate, and is preferably 2–3 moles $H_2O_2$ per mole thiosulfate.

The thiosulfate concentration in the recirculated aqueous absorption medium is desirably maintained below about 20% by weight, expressed as $Na_2S_2O_3$, and preferably is maintained between about 5 to 15% by weight.

The drawing is a schematic flow diagram illustrating a preferred embodiment of the invention as applied to the Stretford wet desulfurization process for treating $H_2S$-containing gas streams.

The process of the invention is applicable to cyclic wet desulfurization systems that employ an aqueous alkaline absorption medium containing a regenerable oxidizing agent and in which thiosulfate salt buildup in the absorption medium is a problem.

Thiosulfate formation in wet desulfurization systems occurs primarily when dissolved $H_2S$ in the aqueous absorption medium, in the form of hydrosulfide, is oxidized from a $-2$ valence state to a $+2$ valence state:

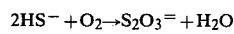

$$2HS^- + O_2 \rightarrow S_2O_3^= + H_2O$$

Thiosulfate may also be formed by the reaction between elemental sulfur in the process solution and alkali metal or ammonium carbonate present in the alkaline absorption medium.

Thiosulfate which is formed in wet desulfurization systems is ordinarily present as an alkali metal or ammonium salt, depending on the composition of the compounds used to maintain the alkalinity of the aqueous absorption medium. The thiosulfate concentration in aqueous absorption medium of wet desulfurization systems tends to accumulate over time, since the aqueous medium ordinarily is regenerated and recirculated, only elemental sulfur being recovered from it.

The rate of thiosulfate formation appears to be significantly increased by process solution temperatures above 40° C., especially above 60° C.; by high solution pH, above 8 and especially above 9; by high concentrations of dissolved oxygen in the aqueous absorption medium during the $H_2S$ absorption step; and (for Stretford process solutions) by low vanadium content in such solutions.

In representative wet desulfurization processes, the amount of $H_2S$ which oxidizes to byproduct thiosulfate instead of the desired elemental sulfur may range from as low as 0.1% up to 5–6% or more of the absorbed $H_2S$. The amount of $H_2S$ absorbed from the gas stream which forms byproduct thiosulfate is desirably maintained within 0.1–1% and preferably at about 0.1–0.2%, by weight.

In a representative Stretford process treating a gas stream to reduce its $H_2S$ content from an average of 1–3% to less than 5 ppm $H_2S$ in the exiting gas stream, about 0.2% of the absorbed $H_2S$ will form byproduct thiosulfate instead of elemental sulfur, if the process is operated efficiently. Conversion of 3–6% or more of the absorbed $H_2S$ in a Stretford process to byproduct thiosulfate is deemed excessive.

If allowed to accumulate unchecked in the recirculated absorption medium, thiosulfate will eventually reach a saturation concentration and begin to precipitate in the system. The gelatinous nature of thiosulfate salts makes their separation from the aqueous absorption medium extremely difficult by conventional filtration techniques. The gelatinous precipitate, if separated from the process solution, is likely to contain valuable oxidizing agents trapped within it, which is not amenable to recovery by washing and which may consequently be lost when the precipitate is discarded.

High concentrations of thiosulfate in the recirculated aqueous absorption medium can also result in significant increases in the solution viscosity, especially when the thiosulfate concentration is in excess of 15% by weight, expressed as $Na_2S_2O_3$. This typically results in undesirable process operating difficulties, as in pumping the aqueous absorption medium.

Extremely high thiosulfate concentrations, in excess of about 15% by weight $Na_2S_2O_3$ and which are near the saturation point, may also have an adverse effect on the $H_2S$-oxidation reaction efficiency in the aqueous absorption medium. Consequently, the thiosulfate concentration is preferably maintained in the recirculated aqueous absorption medium at a level below about 15% by weight, expressed as $Na_2S_2O_3$.

The process of this invention employs a peroxygen chemical, preferably hydrogen peroxide, to control the level of thiosulfate in wet desulfurization systems, i.e., in the recirculated and regenerated aqueous absorption medium used in such systems.

Sufficient hydrogen peroxide or other suitable peroxygen chemical is added to the wet desulfurization system aqueous absorption medium to maintain the level of thiosulfate below a saturation concentration. While hydrogen peroxide is most preferred as the peroxygen source, peroxygen chemicals such as sodium carbonate peroxide, sodium perborate, sodium pyrophosphate peroxide, sodium peroxide and urea peroxide may also be used.

The reaction of the preferred hydrogen peroxide with thiosulfate in alkaline aqueous media appears to result in sulfate as the reaction product:

$$S_2O_3^= + 4H_2O_2 + 2OH^- \rightarrow 2SO_4^= + 5H_2O$$

The stoichiometry of this reaction requires four moles of hydrogen peroxide for each mole of thiosulfate. In a preferred embodiment of this invention, less than the stoichiometric amount of peroxide needed to oxidize thiosulfate to sulfate, i.e., a stoichiometric insufficiency, is introduced into the aqueous absorption medium.

The level of thiosulfate in the aqueous absorption medium is desirably not reduced to a negligible concentration and is maintained at a concentration above 0.5%, preferably above about 5% by weight as $Na_2S_2O_3$. The presence of such thiosulfate in the medium is apparently beneficial in lessening the destruction of the regenerable oxidizing agent. The presence of these amounts of thiosulfate appears to have no adverse effect on the efficiency of the aqueous absorption medium in its absorption of $H_2S$ and in its oxidation of absorbed sulfide to elemental sulfur. It is clear, however, that the thiosulfate concentration must be maintained below a saturation concentration in the recirculated aqueous absorption medium.

The amount of hydrogen peroxide or other peroxygen chemical employed should therefore be sufficient to maintain the thiosulfate concentration in the aqueous absorption medium below a saturation concentration and within a concentration range of from about 0.5% to 20% by weight, expressed as $Na_2S_2O_3$, with about 5 to 15% being preferred. It should be apparent that the saturation concentration for thiosulfate in an aqueous absorption medium will vary with the temperature of the solution and with the presence of other chemical species (oxidizing agent, alkalis and the like).

The amount of the preferred hydrogen peroxide introduced into the $S_2O_3$-containing absorption medium ordinarily is between 0.1 to 3.9 moles per mole of thiosulfate present in the absorption medium. Preferably, from about 2 to 3 moles $H_2O_2$ per mole of thiosulfate are introduced into the aqueous absorption medium. Amounts of hydrogen peroxide exceeding 4 moles $H_2O_2$ per mole of thiosulfate may be used, but such amounts may have the effect of converting substantially all thiosulfate to sulfate, leaving no residual thiosulfate in the aqueous absorption medium.

Hydrogen peroxide is preferred as the peroxygen since it decomposes into relatively innocuous by-products, oxygen and water, which do not introduce additional chemical species in the aqueous absorption medium. However, dissolved oxygen from the decomposition of excess peroxide may cause absorbed hydrosulfide (HS) to become oxidized to thiosulfate. Excess hydrogen peroxide remaining in the aqueous absorption medium may also contribute to the decomposition of the regenerable oxidizing agent, since $H_2O_2$ is itself a strong oxidant.

The hydrogen peroxide or peroxygen chemical may be added to the aqueous absorption medium at any point in the wet desulfurization system cycle. Superior results, however, are obtained when the peroxide is introduced into the aqueous absorption medium after it has been regenerated (with an oxygen-containing gas) and, further, after recovery of the elemental sulfur therefrom and prior to its being contacted with $H_2S$-containing gas streams.

Introduction of the peroxide into the aqueous absorption medium after regeneration of the medium minimizes undesirable reactions of peroxide with hydrosulfide (to form thiosulfate) or with the regenerable oxidizing agent.

The peroxide may be added to the wet desulfurization system either continuously or periodically or intermittently, as desired, to control the thiosulfate concentration in the aqueous absorption medium. The peroxide addition is desirably intermittent, such as once very few days, because thiosulfate accumulation in the recirculating aqueous absorption medium is usually too slow to justify continuous introduction of peroxide.

The manner in which the peroxide is introduced into the aqueous absorption medium is not critical. The reaction between the peroxide and thiosulfate is ordinarily rapid, within a few seconds or minutes, so long reaction residence times are not required. The peroxide treatment may be performed in a suitable reaction vessel, with the peroxide being pumped into and mixed with the aqueous absorption medium. More preferably, the peroxide is injected directly into a stream of aqueous absorption medium, in a manner which provides for adequate mixing and reaction time before the treated stream is recirculated to the absorption unit.

Hydrogen peroxide is desirably added to the aqueous absorption medium, as an aqueous solution, containing from 0.01 to 52% by weight $H_2O_2$. Preferably, an aqueous $H_2O_2$ solution containing from about 30–50% by weight $H_2O_2$ is employed. Peroxygen chemicals other than hydrogen peroxide are ordinarily introduced into the aqueous absorption medium as aqueous solutions, containing from 0.01% by weight up to saturation of the peroxygen chemical, saturated solutions being preferred.

The temperature during the addition of the peroxide is not critical. Any temperature at which the wet desulfurization system process liquor is ordinarily maintained is satisfactory. Such temperatures may range between 20° to 50° C., with 25° to 45° C. being preferred in most wet desulfurization systems. In the Stretford wet desulfurization process, for example, the process solution temperature is generally maintained around 40° C.

Since small amounts of peroxide are added relative to the amount of aqueous absorption medium, the introduction of the aqueous hydrogen peroxide or peroxygen chemical solution will ordinarily have little impact on the temperature of the medium to which it is added. The peroxide may therefore be at ambient temperature, preferably between 15° C. to 30° C., and introduced at that temperature into the aqueous absorption medium which is at its ordinary operating temperature.

Pressure is not a critical factor. Atmospheric pressure is preferred during introduction of the peroxide to the aqueous absorption medium but subatmospheric pressure (a partial vacuum) is also feasible.

The reaction of peroxide with thiosulfate results, as previously noted, in sulfate as the oxidation reaction product, which remains dissolved in the aqueous absorption medium. Sulfate salts, unlike thiosulfate salts, ordinarily precipitate as readily filterable crystals and present no special problems when recovered from wet desulfurization systems. The concentration of sulfate in the recirculating aqueous absorption medium is desirably maintained below a concentration at which sulfate salts begin to precipitate.

If the sulfate concentration in the aqueous absorption medium does become excessive, approaching a saturation level, conventional crystallization techniques may be used to precipitate sulfates as alkali metal, alkaline earth metal, or ammonium salts. Crystallization may be effected, for example, by evaporative crystallization techniques or by cooling the aqueous absorption medium to lower the sulfate solubility. Sulfate may alternatively be precipitated as calcium sulfate by the addition of lime to the sulfate-containing aqueous absorption medium.

Regardless of the precipitation technique employed, the precipitated sulfate salt crystals are readily recovered from the aqueous absorption medium by conventional solids-liquid separation procedures, e.g., filtration, settling-decanting, and the like.

The drawing illustrates the operation of a representative Stretford wet desulfurization process in which the recirculating thiosulfate-containing process solution is treated according to the invention. Only the basic operations of a Stretford process are shown in the drawing, which is not intended to be a comprehensive layout illustrating all equipment and process steps for a commercial Stretford process.

The net result effected by the cyclic Stretford process is the indirect oxidation of absorbed hydrogen sulfide by oxygen gas (air) to form elemental sulfur:

$$H_2S + O_2 \rightarrow S + H_2O$$

A gas stream 1, e.g., a hydrogenated Claus process tail gas stream, containing about 1-3% hydrogen sulfide is passed upwardly through a gas absorber ("ABSORBER") and exits as a substantially $H_2S$-free gas stream 2, containing less than 5 ppm $H_2S$, at the top of the ABSORBER. Aqueous absorption solution 3 is introduced near the top of the ABSORBER and flows countercurrently to the gas stream, with which it is intimately contacted.

The aqueous absorption medium, i.e., Stretford solution, is an alkaline solution which has a pH above 7, preferably between about 8.0 to 9.5. The alkalinity of the Stretford solution is maintained by the addition of alkali such as caustic soda; caustic potash; ammonia; sodium, potassium or ammonium carbonates or bicarbonates; or organic bases such as alkanolamines. Sodium carbonate and bicarbonate are usually preferred, being present in amounts of about 1-8 g $Na_2CO_3$ and 10-30 g $NaHCO_3$/liter Stretford solution.

Ammonium alkalis may be preferred, under some circumstances, for controlling alkalinity since their use appears to reduce the rate of thiosulfate formation. This apparently is due to the buffering action of the ammonia which facilitates pH maintenance below 9.0.

The Stretford solution also contains an anthraquinone disulfonate (ADA), preferably the 2,6 and 2,7 disodium salt isomers. The ADA concentration in the Stretford solution is typically 0.3-3 g ADA (calculated as the disodium salt)/liter, preferably 2.5 g/liter Stretford solution.

In addition to the ADA, a water-soluble vanadium compound is present, usually as an alkali metal or alkaline earth metal or ammonium salt, sodium vanadate being preferred. The Stretford solution ordinarily contains about 0.3-6 g V (as metal)/liter Stretford solution. Other chemicals, particularly sesquestering agents or chelating agents like citrates, tartrates, borates or phosphates, may also be present to enhance the water-solubility of the vanadate and/or act as buffering agents.

The Stretford solution is maintained at a temperature of about 40° C. so as to minimize thiosulfate formation (which increases at higher temperatures) and to maintain satisfactory vanadate reaction efficiency (which decreases at lower temperatures).

The $H_2S$ is absorbed from the gas stream 1 into the Stretford solution in the ABSORBER and exits in the liquid stream 4. The absorbed $H_2S$ is present in the Stretford solution as a dissolved sodium hydrosulfide (NaHS), because of the reaction of sodium carbonate present in the Stretford solution with the $H_2S$:

$$H_2S + Na_2CO_3 \rightarrow NaHS + NaHCO_3$$

The hydrosulfide is oxidized to elemental sulfur by its reaction with the water-soluble vanadate salt:

$$2NaVO_3 + NaHS + NaHCO_3 \rightarrow S + Na_2V_2O_5 + Na_2CO_3 + H_2O$$

A small portion, about 0.2%, of the absorbed hydrogen sulfide, however, reacts to form sodium thiosulfate byproduct which accumulates in the recirculated Stretford solution.

The liquid stream 4 exiting from the ABSORBER may be retained in a holding tank (not shown in the drawing) to promote completion of the hydrosulfide oxidation to sulfur and allow the elemental sulfur to precipitate.

The liquid stream 4 from the ABSORBER is passed to an oxidizer reaction tank ("OXIDIZER"). Air 5 is sparged into the sulfur-containing suspension contained in the OXIDIZER.

The air introduced into the OXIDIZER, as the oxygen source, serves to regenerate the reduced oxidizing agent, and the ADA is also regenerated at the same time:

$$Na_2V_2O_5 + ADA(oxidized) \rightarrow 2NaVO_3 + ADA(reduced)$$

$$ADA(reduced) + \tfrac{1}{2}O_2(air) \rightarrow ADA(oxidized)$$

Regeneration of the reduced oxidizing agent converts the vanadium from a +4 valence state back a +5 valance state as the vanadate, with the ADA present in solution serving as the oxidation catalyst and/or oxygen carrier.

The introduction of sparged air into the OXIDIZER also causes finely divided particles of elemental sulfur to rise to the top as a froth, which is skimmed off as a sulfur froth overflow 6. The sulfur froth 6 is dewatered in a filter ("SULFUR FILTER") and the sulfur cake 8 autoclaved (not shown) to yield pure (99.9%) solid sulfur.

The filtrate 9 from the SULFUR FILTER may be combined with relatively sulfur-free solution 7 which is withdrawn from the OXIDIZER. This sulfur-free solution stream 10 constitutes regenerated Stretford solution, which contains sodium thiosulfate byproduct dissolved in it.

In accordance with the practice of this invention, the thiosulfate-containing, regenerated Stretford solution 10 is treated with sufficient aqueous hydrogen peroxide solution 11, 35% by weight $H_2O_2$, to maintain the thiosulfate concentration below a saturation level (about 20% by weight $Na_2S_2O_3$), and preferably in the range of 5-15% by weight $Na_2S_2O_3$.

The aqueous hydrogen peroxide 11 is introduced into the sulfur-free regenerated Stretford solution 10 in a mixing operation ("H$_2$O$_2$ TREATMENT") on an intermittent basis, preferably once every one to six months. The aqueous hydrogen peroxide 10 is added whenever the thiosulfate level in the recirculating Stretford solution approaches a saturation concentration. This may conveniently be monitored by periodically measuring the specific gravity of the recirculating Stretford solution, since a specific gravity in excess of about 1.2 ordinarily indicates the presence of a high thiosulfate concentration, nearing a saturation level.

The H$_2$O$_2$ TREATMENT is preferably carried out via injecting the aqueous hydrogen peroxide into the Stretford solution in a mixing zone, such as in-line pipe mixer, which assures adequate residence time for reaction prior to the treated Stretford solution 3 being returned to the ABSORBER.

After the H$_2$O$_2$ TREATMENT step, the regenerated and H$_2$O$_2$-treated Stretford solution 3 is recycled to the ABSORBER to contact the H$_2$S-containing gas stream 1.

The recirculated Stretford solution 3 may be treated as necessary, usually at infrequent intervals, to recover the sulfate which accumulates as thiosulfate is oxidized with hydrogen peroxide. Typically, recovery of sulfate may be accomplished by cooling a side stream of regenerated Stretford solution (not shown) below its ordinary operating temperature to crystallize from solution sodium sulfate, which precipitates as a readily filterable solid salt. After separation of the solid sodium sulfate from the slurry by filtration, the sulfate-free mother liquor is returned to the main body of recirculating Stretford solution being recycled to the ABSORBER.

EXAMPLES

An aqueous solution corresponding to thiosulfate-free Stretford process liquor was prepared, by mixing appropriate amounts of the named components in water to obtain the following composition: anthraquinone 2,7 disulfonic acid disodium salt (0.25 weight percent); vanadium pentoxide (0.44 weight percent); sodium hydroxide (0.39 weight percent); sodium bicarbonate (2.50 weight percent); sodium carbonate (1.09 weight percent); and water (95.33 weight percent). The pH of the solution was 9.4, and its density was 1.03 g/ml.

A standard procedure was employed in examples in which this Stretford process solution was used to treat hydrogen sulfide gas. In this cyclic procedure, hydrogen sulfide gas (100% H$_2$S) was bubbled into 200 ml of Stretford solution, contained in a 250 ml gas washing bottle, at a temperature of 45° C. for a ten minute period. During the absorption of the H$_2$S gas, the color of the Stretford solution changed rapidly from a clear orange to a very dark brown.

Following the H$_2$S absorption, air was bubbled through this Stretford solution until the color of the solution reverted to its original clear orange. This aeration step typically required between 76 to 111 minutes.

The finely divided solid sulfur which had formed from the oxidation to the H$_2$S during the previous steps was thereafter recovered by vacuum filtration. The filter cake was water washed and dried at a temperature of 95° C. to constant weight. The water washes were discarded, since their addition to the mother liquor would have resulted in an unwanted dilution of the mother liquor.

The mother liquor remaining after recovery of the sulfur, i.e., regenerated Stretford solution, was reused to treat more H$_2$S gas in the same manner as described above. The H$_2$S absorption-oxidation-regeneration procedure was repeated five times using the mother liquor from the immediately previous run.

Upon the conclusion of the six-cycle procedure in the examples, the mother liquor was analyzed for vanadium content, by atomic absorption, and for sodium thiosulfate content, by titration. Thiosulfate content was determined by adding 1 ml formaldehyde to an aliquot of solution and titrating it with 0.1 N iodine solution. Thiosulfate content is reported as percent by weight Na$_2$S$_2$O$_3$.

The Table summarizes the parameter values employed and the analytical results from the examples in which H$_2$S gas was treated with Stretford solution in the above-mentioned procedure. Examples A and B are comparative examples, and Examples 1, 2 and 3 illustrate an embodiment of the invention; the details of each of these examples are described below.

Comparative Example A was a control in which no hydrogen peroxide was added to the Stretford solution. Two hundred ml of Stretford solution were employed to treat H$_2$S gas in the six-cycle H$_2$S absorption-oxidation-regeneration procedure described above.

Thiosulfate content in the final cycle mother liquor was 6.1 g (0.038 g-mole). The mother liquor contained 88% of the vanadium originally present in the first cycle Stretford solution. The pH of the final cycle mother liquor was 9.2. An average of 0.88 g sulfur was recovered in each of the six cycles.

In Example 1, 200 ml of Stretford solution was used to treat H$_2$S gas following the standard procedure. However, Example 1 differed from Comparative Example A in that 1 ml of aqueous hydrogen peroxide (50% by weight H$_2$O$_2$) was added to the Stretford solution following the aeration step, prior to the recovery of the sulfur by filtration, in each of the six cycles. The total amount of aqueous hydrogen peroxide added was therefore 6 ml (7.2 g 50% H$_2$O$_2$=0.105 g-mole), which was stoichiometrically sufficient to react with 0.026 g-mole Na$_2$S$_2$O$_3$.

The final cycle mother liquor in Example 1 contained only 1.9 g Na$_2$S$_2$O$_3$ (0.012 g-mole), which was 4.2 g (0.026 g-mole) less than in Comparative Example A. It retained 84% of the original vanadium. The pH of the final cycle mother liquor was 8.4. An average of 0.77 g sulfur was recovered in each cycle.

In Comparative Example B, 30 g sodium thiosulfate (0.190 g-mole) was added to 200 g of Stretford solution, so as to provide a substantial thiosulfate concentration in the solution even prior to its first contact with H$_2$S gas. Two hundred ml of the S$_2$O$_3$-containing Stretford solution was used to treat H$_2$S gas in the standard procedure described above. No hydrogen peroxide was added at any point in this comparative example.

After 6 cycles of H$_2$S absorption-oxidation-regeneration, the final cycle mother liquor contained 32.5 g Na$_2$S$_2$O$_3$ (0.205 g-mole), an increase of about 2.5 g (0.015 g-mole) over the initial Stretford solution Na$_2$S$_2$O$_3$ content. Vanadium retention was 68%, somewhat lower than in previous examples. The final cycle mother liquor had a pH of 9.2. An average of 0.93 g sulfur was recovered in each cycle.

In Example 2 the Stretford solution was dosed with thiosulfate in a manner identical to that of Comparative Example B. The same procedure as used in Comparative Example B was followed except that 1 ml of aqueous hydrogen peroxide (50% by weight H$_2$O$_2$) was added to the Stretford solution after aeration in each of the six cycles. A total of 6 ml (7.2 g 50% $_2O_2$) aqueous hydrogen peroxide, which corresponded to 0.105 g-mole $H_2O_2$ was therefore added. This amount of $H_2O_2$ was stoichiometrically sufficient to react with 0.026 g-mole $Na_2S_2O_3$.

The final cycle mother liquor in Example 2 contained 27.1 g $Na_2S_2O_3$ (0.171 g-mole), representing a decrease of about 2.9 g (0.018 g-mole) over the initial Stretford solution $Na_2S_2O_3$ content. It retained 96% of the original vanadium. The final cycle mother liquor pH was 8.4. An average of 1.06 g sulfur per cycle was recovered.

In Example 3, 15 g $Na_2S_2O_3$ (0.095 g-mole) was added to 200 g Stretford solution, and 200 ml of this solution was employed in the Example. The Stretford solution was contacted with $H_2S$ gas using the standard $H_2S$ absorption-oxidation-regeneration procedure.

After the aeration step in each of the six cycles in Example 3, 0.5 ml aqueous hydrogen peroxide (50% by weight $H_2O_2$) was added to the solution. A total of three ml (3.6 g 50% $H_2O_2$) aqueous hydrogen peroxide, corresponding to 0.053 g-mole $H_2O_2$, was therefore added. This amount of $H_2O_2$ was stoichiometrically sufficient to react with 0.013 g-mole $Na_2S_2O_3$.

At the conclusion of the sixth cycle in Example 3, the mother liquor contained 17.3 g $Na_2S_2O_3$ (0.109 g-mole), an increase of about 2.3 g (0.014 g-mole) over the starting Stretford solution $Na_2S_2O_3$ content. This thiosulfate increase was substantially less than that which might be anticipated for a similar (control) example involving no $H_2O$ treatment of the Stretford solution. An increase in thiosulfate of about 4.5 g would be expected with no $H_2O_2$ treatment, based on the 6.1 g increase in Comparative Example A and 2.5 g increase in Comparative Example B.

The final cycle mother liquor in Example 3 retained 90% of the original vanadium. Its pH was 8.8. An average of 0.98 g sulfur per cycle was recovered.

In Example 4, the thiosulfate saturation level was determined for the Stretford solution described above, at a temperature of 50° C. Sodium thiosulfate was added gradually with stirring to 200 ml Stretford solution, having a composition as noted above, until the continued presence of undissolved solid $Na_2S_2O_3$ indicated a saturated solution had been achieved. The mixture was filtered to separate the solids, and the clear filtrate was analyzed for its thiosulfate content.

An average of 4 trials in Example 4 indicated the saturated Stretford solution contained 21.08% by weight $Na_2S_2O_3$, which was equivalent to 26.7 parts by weight $Na_2S_2O_3$ per 100 parts thiosulfate-free Stretford solution.

I claim:

1. In a cyclic wet desulfurization process for recovering elemental sulfur from hydrogen sulfide-containing gas streams by the steps of
   (i) contacting an $H_2S$-containing gas stream with an aqueous alkaline absorption medium containing a regenerable oxidizing agent;
   (ii) absorbing $H_2S$ into the absorption medium and converting it to a hydrosulfide;
   (iii) oxidizing the hydrosulfide with the oxidizing agent to form sulfur, which is subsequently recovered from the absorption medium;
   (iv) regenerating the absorption medium by contacting it with an oxygen-containing gas; and
   (v) recirculating the regenerated absorption medium to repeat the desulfurization cycle;
the improvement for controlling the concentration of dissolved thiosulfate byproduct which forms in the absorption medium, which comprises introducing a peroxide chemical, selected from the group consisting of hydrogen peroxide, sodium carbonate peroxide, and sodium peroxide, into the thiosulfate-containing absorption medium in an amount sufficient to maintain the thiosulfate below its saturation concentration.

2. The method of claim 1 wherein the peroxide chemical is aqueous hydrogen peroxide.

3. The method of claim 2 wherein the aqueous hydrogen peroxide contains from about 30 to 50 weight percent $H_2O_2$.

4. The method of claim 1 wherein the peroxide chemical is selected from the group consisting of sodium carbonate peroxide and sodium peroxide and is added as a saturated aqueous solution thereof.

5. The method of claim 1 wherein the peroxide chemical is introduced into the thiosulfate-containing absorption medium after its regeneration.

6. The process of claim 1 wherein the absorption medium contains a dissolved quinone-type regenerable oxidizing agent.

7. The process of claim 1 wherein the aqueous absorption medium contains a dissolved anthraquinone-type regenerable oxidizing agent.

8. The process of claim 7 wherein the absorption medium contains an anthraquinone disulfonic acid salt and an alkali metal vanadate.

9. The process of claim 1 wherein the absorption medium contains a dissolved naphthoquinone-type regenerable oxidizing agent.

10. The process of claim 9 wherein the naphthoquinone-type oxidizing agent is 1,4-naphthoquinone-2-sulfonic acid salt.

11. In a cyclic wet desulfurization process for recovering elemental sulfur from hydrogen sulfide-containing gas streams by the steps of

TABLE

| Example | Stretford Solution Initial pH | Thiosulfate Added to Stretford Solution (g $Na_2S_2O_3$/ 200 g Soln) | Treated Stretford Solution** | | | |
|---|---|---|---|---|---|---|
| | | | $H_2O$ Introduced (g 50% $H_2O_2$) | Final pH | Thiosulfate Content (g $Na_2S_2O_3$) | Vanadium Content (% of Initial) | Sulfur Recovered (g S) |
| A* | 9.4 | 0 | 0 | 9.2 | 6.1 | 88 | 5.3 |
| 1 | 9.4 | 0 | 7.2 | 8.4 | 1.9 | 84 | 4.6 |
| B* | 9.4 | 30 | 0 | 9.2 | 32.5 | 68 | 5.6 |
| 2 | 9.4 | 30 | 7.2 | 8.4 | 27.1 | 96 | 6.4 |
| 3 | 9.4 | 15 | 3.6 | 8.8 | 17.3 | 90 | 5.9 |

*Comparative example
**200 ml solution treated (i) contacting an H₂S-containing gas stream with an aqueous alkaline absorption medium containing an anthraquinone disulfonic acid salt and an alkali metal vanadate;

(ii) absorbing H₂S from the gas stream into the absorption medium, and thereby forming a dissolved hydrosulfide;

(iii) providing sufficient time for the dissolved hydrosulfide to be oxidized to elemental sulfur, in the presence of the anthraquinone disulfonic acid salt and alkali metal vanadate;

(iv) regenerating the absorption medium by contacting it with an oxygen-containing gas;

(v) recovering the elemental sulfur from the absorption medium; and (vi) recirculating the regenerated absorption medium to repeat the desulfurization cycle;

the improvement for controlling the concentration of dissolved thiosulfate byproduct which forms in the absorption medium, which comprises introducing aqueous hydrogen peroxide into the thiosulfate-containing absorption medium, after regeneration of the absorption medium, in an amount sufficient to maintain the thiosulfate below its saturation concentration.

12. The method of claim 5 or 11 wherein the peroxide is introduced into the regenerated absorption medium after recovery of the sulfur and prior to its being contacted further with an H₂S-containing gas stream.

13. The method of claim 1 or 11 wherein the amount of peroxide introduced is less than the stoichiometric quantity required to oxidize all of the thiosulfate in the absorption medium to sulfate.

14. The method of claim 13 wherein the amount of peroxide introduced into the thiosulfate-containing absorption medium is about 2 to 3 moles peroxide per mole thiosulfate.

15. The method of claim 1 or 11 wherein sufficient peroxide is introduced into the absorption medium to maintain its thiosulfate concentration below about 20% by weight, expressed as $Na_2S_2O_3$.

16. The method of claim 15 wherein sufficient peroxide is introduced to maintain the thiosulfate concentration between about 5 to 15% by weight, expressed as $Na_2S_2O_3$.

17. The method of claim 1 or 11 wherein the peroxide is introduced into the absorption medium at a temperature of from about 20° C. to 50° C.

18. The method of claim 1 or 11 wherein the peroxide is introduced into the absorption medium on an intermittent basis.

19. The method of claim 1 or 11 wherein the oxygen-containing gas in the absorption medium regeneration step is selected from the group consisting of air and oxygen.

20. The method of claim 1 or 11 wherein the alkalinity of the aqueous absorption medium is provided by the addition of an alkaline material selected from the group consisting of $Na_2CO_3$, $NaHCO_3$, $NaOH$, $K_2CO_3$, $KHCO_3$, $KOH$, $(NH_4)_2CO_3$, $NH_4HCO_3$ and $NH_4OH$.

* * * * *